Dec. 6, 1955
R. E. BANKER
2,725,781
RETICLE FOR ELIMINATING PARALLAX FROM SIGHTS
Filed Oct. 15, 1951
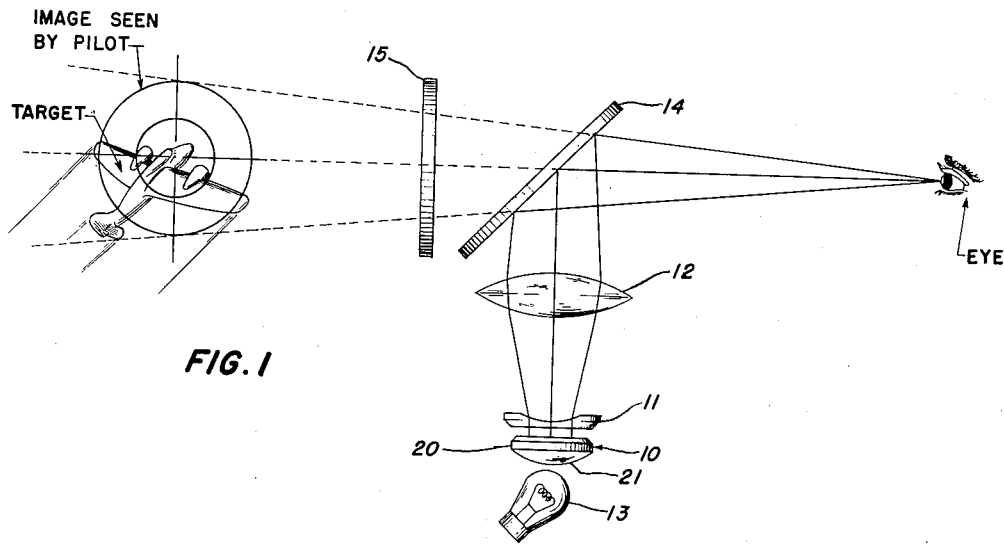
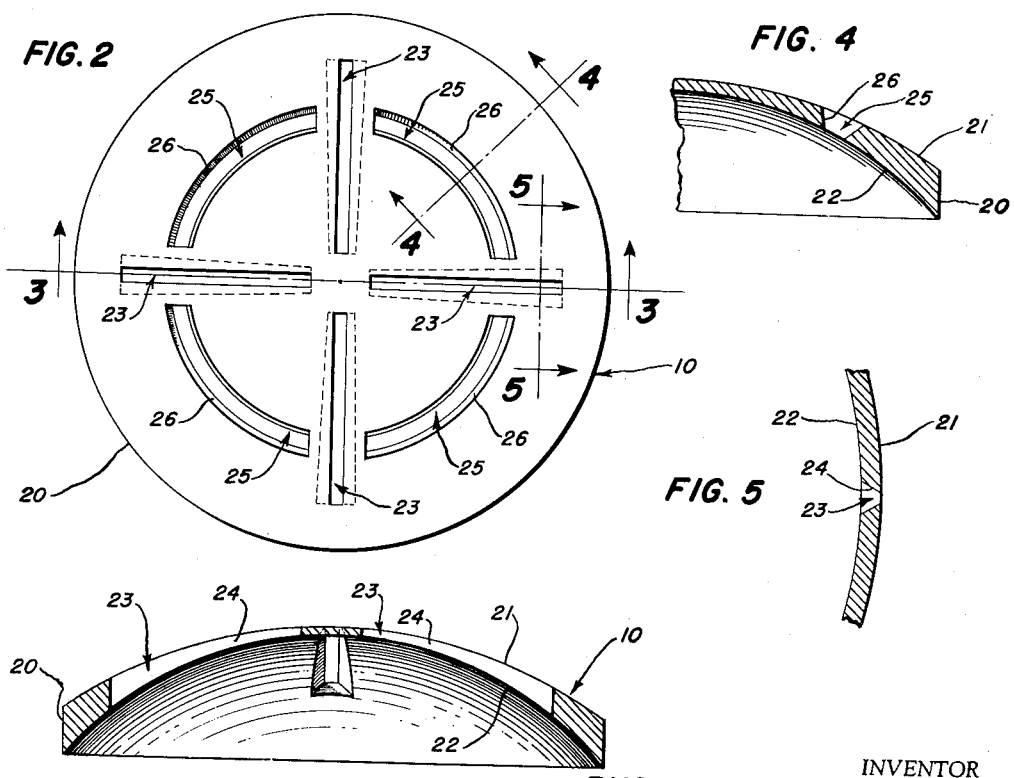
INVENTOR
RUSSELL E. BANKER
BY
ATTORNEY 2,725,781
RETICLE FOR ELIMINATING PARALLAX FROM SIGHTS Russell E. Banker, Washington, D. C.

Application October 15, 1951, Serial No. 251,434

1 Claim. (Cl. 88—1)

(Granted under Title 35, U. S. Code (1952), sec. 266)

The present invention relates to a reticle for eliminating parallax from sights and more particularly to a reticle for eliminating parallax from reflector or illuminated sights.

If a reticle cross line is placed in the focal plane of a positive lens the exit rays from the lens, for any point on the reticle pattern, are theoretically parallel. The reticle thus has the practical effect of being positioned at an infinite distance from the observer. Such a system is used as a sighting device and as such is termed a "collimator sight." In the fundamental type of collimator sight the system consists of a reticle plate and a lens mounted in a thin walled tube. The reticle consists of an opaque metal plate with a cross cut through it. The eye is placed before the lens so that it receives light from both the target and the sight. As the reticle is at a focal plane of the lens it is imaged on the retina together with the target and the cross appears superimposed on the target.

A variation in design is found in the reflector sight or illuminated sight. In this type of sight the reticle is also opaque with transparent slots forming the desired pattern. This type of sight employs a reticle illuminated by an incandescent lamp source, and a lens system for imaging the reticle at infinity. However, the axis of the lens, reticle and lamp is usually in a vertical position and a glass plate, inclined approximately 45° with respect to the exit surface of the lens system, allows the observer to see the reflected image of the reticle. Light from the distant target also passes through this plate and reaches the observer's eye. Since the reticle is imaged at infinity by the lens system it is also seen in the plane of the target.

One of the major faults in the system described above is the inability of the lens system to form an image at infinity of all points on the reticle. Some image points thus lie at a finite distance from the eye. A condition whereby the target lies at infinity and the reticle image lies at a finite distance produces an angular error in sighting defined as parallax. Parallax can readily be identified in a reflector sight, merely by moving the eye laterally across the field of view and noting the relative movement between any part of the reticle image and the image of the target in view. It is thus obvious that parallax in a sight can introduce serious errors in sighting, especially if the observer's head is subject to any movement.

In a simple lens system, points lying on a flat surface (plane), perpendicular to the axis of the lens, are not always imaged on a plane by a lens. Actually, if the entire field is to be sharply defined the surface would have to be curved for sharp focus. This characteristic is termed "curvature of field" and is described in standard text books on optics. As a result of this curvature of field, vertical and horizontal lines in the object plane would be imaged in sharp focus upon a surface, generally paraboloid in shape, called the sagittal image surface, and circles concentric with the lens in the object plane would be imaged in sharp focus on a similar surface spaced from the sagittal image surface and referred to as the tangential surface. Departure of the tangential and sagittal image surfaces from an image plane perpendicular to the axis at the focal point gives rise to parallax in the sight.

It has heretofore been attempted to eliminate parallax by employing a thin spherical disc with slots cut through it to allow the passage of light. The purpose of this curved reticle plate was to reach a compromise focus between the tangential and sagittal image surfaces and thus reduce the observed parallax and consequent sighting errors. The gerat disadvantage of this type of reticle is that a very complex lens system must be devised to make the tangential and sagittal image surfaces lie close together so that a reticle of correct radius curvature may be used.

In the reticle of the present invention, a simple lens system with curvature of field present has been utilized. In the reticle plate of the present invention, a disc having opposed curved surfaces is utilized. However, the curves of the surfaces are computed so that they coincide with the tangential and sagittal image surfaces of the lens with which the reticle is to be used. V-shaped slots are then cut for circles and straight lines, the concentric circle slots being cut with the apex of the V facing the lens and the radial slots being cut with the apex of the V facing the light source. By utilizing the reticle of the present invention parallax is eliminated.

It is an object of the present invention to provide a reticle which will eliminate parallax in a sight.

It is another object of the invention to provide a reticle which will eliminate parallax from a reflector or illuminated sight.

It is a further object of the invention to provide a reticle having the surfaces thereof conforming to the sagittal and tangential image surfaces of the lens so as to focus the image of the reticle on a plane at infinity.

Still another object of the invention is to provide a reflector sight utilizing the reticle described herein.

Further objects and advantages will be readily apparent from the following specification and attached drawings in which:

Figure 1 is a diagrammatic view of a reflector sight utilizing the reticle of the present invention;

Figure 2 is a plan view of the reticle showing a preferred embodiment of the invention;

Figure 3 shows a partial section of the device taken on line 3—3 of Figure 2;

Figure 4 shows a partial section taken on a line 4—4 of Figure 2; and

Figure 5 is a partial section taken on line 5—5 of Fig. 2.

Referring now to the drawings wherein like reference characters designate like or corresponding parts throughout the several views, there is shown in Fig. 1 a diagrammatic view of the reflector sight of the present invention. Basically the sight comprises a reticle 10, a collective lens 11, objective lens system, here shown for simplicity as a single lens 12, and a source of illumination 13, which may be an incandescent lamp or other suitable source. A reflecting plate 14 is disposed at an angle of 45° to the axis of the lens system and a sun filter 15 may be provided, if desired.

The light rays from the source 13 pass through the slots in the reticle 10, which are, theoretically, located in the focal plane of the system, and diverge from every point on the reticle. The diverging rays are picked up by the lens system 12 and projected as parallel beams, since the reticle is theoretically in the focal plane of the system. These parallel bundles of rays are interrupted by the reflecting plate 14, where the image appears to be viewed by the eye. Since all the rays which come through the optical system from any one point on the reticle are parallel, the image appears to lie always in the same direction from the observer, and at an infinite distance. The observer, as exemplified by the eye shown in the drawing, also looks through the reflecting plate and sees the target with the image of the reticle lines superimposed on the target, as shown diagrammatically in Fig. 1.

However, if the slots in the reticle all terminate in the same plane, the image of the reticle as seen by the observer will not lie in a plane but will lie on the sagittal and tangential image surfaces of the lens as heretofore described. This results in parallax.

As may be seen from Figs. 2 and 3 of the drawings, the reticle of the present invention comprises a disc 20 which may be of an opaque material, preferably a metal, having a convex surface 21 and a concave surface 22. The surfaces 21 and 22 are surfaces of revolution and are roughly paraboloids. The curve of the face 21 of the disc is computed so that it coincides with the sagittal image surface and the face 22 is computed so that it coincides with the tangential image surface of the lens system 12 used. Reference is made to "The Principles of Optics," by Hardy and Perrin, 1st edition, pages 101 to 103, published by the McGraw-Hill Book Company, Inc., New York, for the method of determining these surfaces.

As will be seen from Fig. 3 of the drawing, the curvature of the surface 21 differs from that of the surface 22 and results in a reticle of varying thickness, the reticle being thickest at its edges and thinnest at the center thereof. Theoretically, the disc should be of zero thickness in the center. However, as a practical matter, the thickness of the disc may be uniform in the center between the ends of the radial slots. This difference in thickness is a result of the difference of curvature of the sagittal and tangential image surfaces. A plurality of radial slots 23 are cut through the reticle as shown. As will be seen from a consideration of Fig. 5, the radial slots 23 have converging side walls 24, with the side walls 24 converging toward the face 21 coinciding with the sagittal image surface. The intersection of these slots with the face 21 are seen as the parallel edged slot 23, by the observer. The reticle is also formed with the concentric slots 25 which are similar in shape to the slots 24 but have side walls 26 which converge toward the surface 22 coinciding with the tangential image surface of the reticle 20. These slots 25 are seen by the observer as concentric circles lying in the surface 22. It will be noted that the slots 23 are terminated inwardly of the edges of the disc 20 and do not continue through the center thereof and that the concentric slots 25 terminate a short distance from the radial slots 23 so that the reticle will remain in one piece.

As described above, in the case of the concentric circle slot 25, Fig. 4, the narrowest part of the slot, and the part that the eye sees when using the sight, intersects the face 22 of the reticle and blocks off the rear surface due to the sharp edge of the slot. Because this intersection lies on the tangential image surface it fulfills the condition for sharp focus and the resulting absence of parallax. Similarly in the case of the radial line slot 23, the side walls 24 converge toward the sagittal surface of the reticle and due to its sharp edge, makes only the intersection with face 21 visible to the observer. Because this intersection lies on the sagittal image surface it also fulfills the condition for sharp focus and the resulting absence of parallax.

When a reticle 10 such as that described herein is utilized in a sight such as that shown in Fig. 1, it is mounted so that face 22 is seen by the observer and surface 21 faces the light source. It will be seen that the image projected onto the reflecting plate 14 will be the image of radial lines at the surface 21 of the reticle and the image of the concentric lines on the surface 22 of the reticle. Since the surfaces 21 and 22 coincide with sagittal and tangential image surfaces of the lens system the image will be brought to focus in a plane at infinity. As has been disclosed, such image on a plane at infinity results in the elimination of parallax from the sight.

The preferred form of the reticle has been described above as being formed of metal or opaque material and as having slots cut therethrough. The reticle may also be formed however of a transparent material such as glass or plastic, not illustrated, having an opaque coating on the surfaces 21 and 22 and formed with slots 23 and 25.

If desired, a suitable mounting flange, not illustrated, may be provided around the outside edge of the reticle. Such flange may take the form of a ring of sufficient thickness to project slightly above the uppermost point of the convex face of the reticle, thus protecting it against damage.

It will be seen that the reticle described above results not only in a reduction of parallax, but in the complete elimination thereof and since it does not depend upon a complicated corrected multi-element lens system, it results in a material saving in the cost of the completed sight. Because of the increased thickness of the reticle at the edges thereof, it results in a construction of greater strength and rigidity than that of the prior art.

Obviously many modifications and variations of the present invention become possible in the light of the above teaching. It is therefore to be understood, that the invention is not to be limited to the exact details of construction disclosed, since only the preferred form has been disclosed by way of illustration.

The invention described herein may be manufactured and used by or for the Government of the United States of America for governmental purposes without the payment of any royalties thereon or therefor.

What is claimed is:

In a reticle for use in a reflector sight or the like employing a lens system having a sagittal and a tangential image surface, a unitary opaque disc having a convex face and a concave face, said faces respectively conforming in shape to the shape of the sagittal and tangential image surfaces of the lens system, the concave face being of greater curvature than that of the convex face such that said disc increases in thickness radially from a thin central portion and terminates in a relatively thick peripheral marginal mounting and supporting portion, the relatively thick peripheral marginal portion of said disc being sufficient in strength to maintain the curvature of said disc at its thin central portion when the disc is mounted for service, said disc being provided with a reticle pattern formed by a plurality of slots having convergent sidewalls, at least one of said slots being radial and at least one of said slots being at least a part of a circle concentric with the axis of said disc, the radial slot being of minimum width and having parallel closely spaced edges at the intersection of the slot with said convex face whereby the radial slot effectively provides a corresponding narrow light aperture without lens effect at said convex face, and the concentric slot being of minimum width and having parallel closely spaced edges at its intersection with said concave face whereby the concentric slot effectively provides a corresponding narrow light aperture without lens effect at said concave face so that parallax errors for all points in the reticle pattern are theoretically eliminated from the sight.

References Cited in the file of this patent

UNITED STATES PATENTS

| | | |
|---|---|---|
| 2,016,780 | Hartinger | Oct. 8, 1935 |
| 2,393,832 | Stetchbart | Jan. 29, 1946 |
| 2,420,503 | Stetchbart | May 13, 1947 |
| 2,425,400 | Schade | Aug. 12, 1947 |
| 2,437,228 | Mears et al. | Mar. 2, 1948 |